United States Patent
Benes et al.

(10) Patent No.: US 10,351,686 B2
(45) Date of Patent: Jul. 16, 2019

(54) METHODS OF FORMING MODIFIED THERMOPLASTIC STRUCTURES FOR DOWN-HOLE APPLICATIONS

(71) Applicant: Baker Hughes, a GE company, LLC, Houston, TX (US)

(72) Inventors: Michal Benes, The Woodlands, TX (US); Jiaxiang Ren, Houston, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 585 days.

(21) Appl. No.: 13/798,886

(22) Filed: Mar. 13, 2013

(65) Prior Publication Data

US 2014/0272165 A1  Sep. 18, 2014

(51) Int. Cl.
    *C08J 7/12*       (2006.01)
    *C08J 3/24*       (2006.01)
    *C08J 3/28*       (2006.01)

(52) U.S. Cl.
    CPC .............. *C08J 7/123* (2013.01); *C08J 3/243* (2013.01); *C08J 3/244* (2013.01); *C08J 3/245* (2013.01); *C08J 3/28* (2013.01); *C08J 2365/02* (2013.01); *C08J 2371/00* (2013.01); *C08J 2371/12* (2013.01); *C08J 2379/08* (2013.01); *C08J 2381/04* (2013.01); *C08J 2381/06* (2013.01)

(58) Field of Classification Search
    CPC .... C08J 7/123; C08J 2365/02; C08J 2381/06; C08J 2379/08; C08J 2381/04; C08J 2371/12; C08J 3/243; C08J 3/244; C08J 3/245; C08J 3/28; C08J 2371/00
    USPC ........................................................ 427/551
See application file for complete search history.

(56) References Cited

U.S. PATENT DOCUMENTS

| | | | |
|---|---|---|---|
| 4,547,298 A | 10/1985 | Novak | |
| 4,563,509 A * | 1/1986 | Liang | C08G 75/0295 525/537 |
| 5,925,688 A | 7/1999 | Ash et al. | |
| 6,084,052 A | 7/2000 | Aufdermarsh et al. | |
| 7,144,961 B2 | 12/2006 | Nakabayashi et al. | |
| 7,168,147 B2 | 1/2007 | Smith et al. | |
| 7,265,196 B2 | 9/2007 | Zhang et al. | |

(Continued)

FOREIGN PATENT DOCUMENTS

| | | |
|---|---|---|
| CN | 1482157 A | 3/2004 |
| CN | 101793126 A | 8/2010 |

(Continued)

OTHER PUBLICATIONS

University of Delaware "Delaware Composites Design Encyclopedia: Processing and Fabrication Technology, vol. 3" Mar. 28, 1990, p. 61 is provided.*
Chan et al. "Crosslinking of Poly(arylene Ether Ketone)s 1. Rheological Behavior of the Melt and Mechanical Properties of the Cured Resin" Journal of Applied Polymer Science, vol. 32 5933-5943 (1986).*

(Continued)

*Primary Examiner* — Robert S Walters, Jr.
(74) *Attorney, Agent, or Firm* — TraskBritt

(57) ABSTRACT

A method of forming a modified thermoplastic structure for a down-hole application comprises forming a thermoplastic structure comprising at least one thermoplastic material formulated for crosslinking using an electron beam process. The thermoplastic structure is exposed to at least one electron beam to crosslink polymer chains of the thermoplastic structure. Other methods of forming a modified thermoplastic structure, and a down-hole tool are also described.

8 Claims, 6 Drawing Sheets

(56) References Cited

U.S. PATENT DOCUMENTS

| | | | |
|---|---|---|---|
| 7,304,098 B2 | 12/2007 | Li et al. | |
| 7,728,049 B2 * | 6/2010 | Zamore | A61L 31/048 |
| | | | 128/844 |
| 7,888,940 B2 | 2/2011 | Hall et al. | |
| 8,162,057 B2 | 4/2012 | Lewis et al. | |
| 2005/0161212 A1 | 7/2005 | Leismer et al. | |
| 2007/0085242 A1 | 4/2007 | Tamaki et al. | |
| 2008/0157439 A1 | 7/2008 | Park et al. | |
| 2010/0022718 A1 | 1/2010 | Tu et al. | |
| 2010/0140516 A1 | 6/2010 | Butuc | |
| 2010/0263867 A1 | 10/2010 | Horton et al. | |
| 2011/0116959 A1 | 5/2011 | Akbari et al. | |
| 2011/0139466 A1 | 6/2011 | Chen et al. | |
| 2011/0256378 A1 | 10/2011 | Collins et al. | |
| 2011/0304346 A1 | 12/2011 | DiFoggio et al. | |
| 2012/0199347 A1 | 8/2012 | Bicerano | |
| 2013/0032411 A1 | 2/2013 | John et al. | |

FOREIGN PATENT DOCUMENTS

| | | |
|---|---|---|
| CN | 1323253 A | 11/2011 |
| CN | 102959179 A | 3/2013 |
| EP | 2384774 A2 | 11/2011 |
| GB | 1383253 A | 2/1974 |
| WO | 2004065092 A9 | 8/2004 |

OTHER PUBLICATIONS

International Search Report for International Application No. PCT/US2014/023136 dated Aug. 14, 2014, 3 pages.

International Written Opinion for International Application No. PCT/US2014/023136 dated Aug. 14, 2014, 8 pages.

Jeun et al., Enhancement of Mechanical Properties of PEEK Using Radiation Process, Applied Chemistry, vol. 12, No. 2, Nov. 2008, pp. 245-248.

Yurchenko et al., Synthesis, Mechanical Properties and Chemical/Solvent Resistance of Crosslinked Poly(arylether-ketones) at High Temperatures, Polymer, vol. 51 (2010) pp. 1914-1920.

International Preliminary Report on Patentability for International Application No. PCT/US2014/023136 dated Sep. 15, 2015, 9 pages.

Chinese First Office Action for Chinese Application 201480013837.8 dated Dec. 27, 2016, 16 pages.

Chinese First Search for Chinese Application No. 201480013837.8 dated Dec. 19, 2016, 2 pages.

European Partial Supplementary Search Report for European Application No. 14779751, dated Nov. 8, 2016, 5 pages.

European Supplementary Search Report for European Application No. 14779751, dated Feb. 15, 2017, 4 pages.

Chinese Office Action and Supplemental Search Report from Chinese Application No. 201480013837.8, dated Feb. 2, 2018, 18 pages.

\* cited by examiner

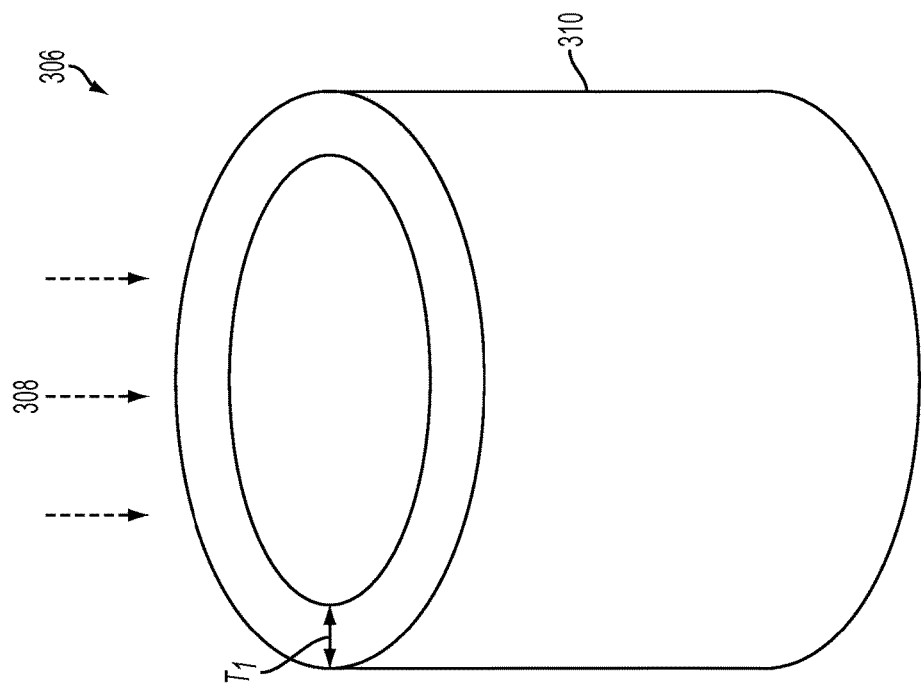
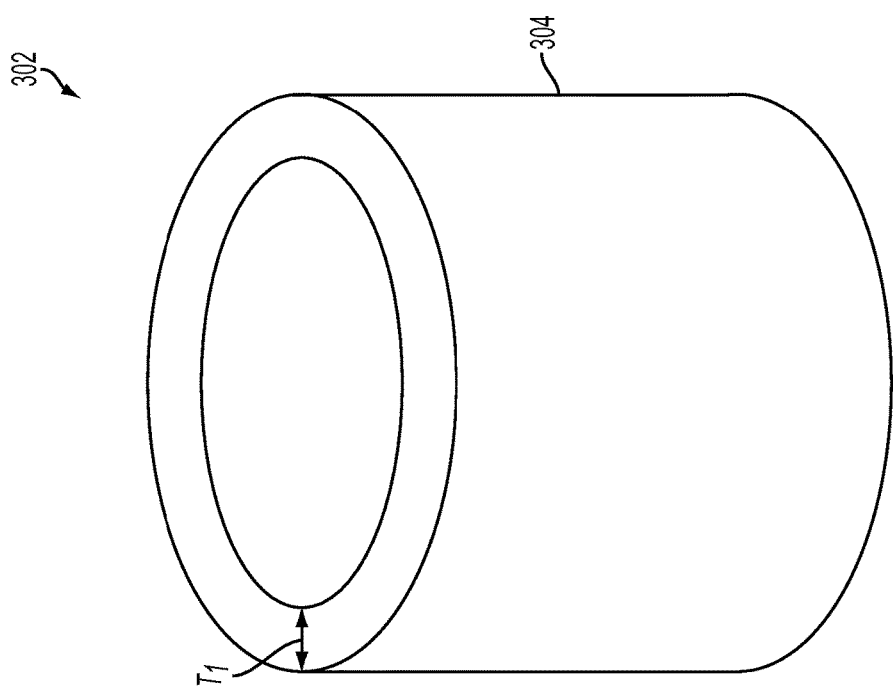
FIG. 3A
FIG. 3B

US 10,351,686 B2

METHODS OF FORMING MODIFIED THERMOPLASTIC STRUCTURES FOR DOWN-HOLE APPLICATIONS

FIELD

Embodiments of the disclosure relate generally to methods of forming structures for down-hole applications, and to related down-hole tools. More particularly, embodiments of the disclosure relate to methods of forming modified thermoplastic structures for down-hole applications, and to related down-hole tools.

BACKGROUND

Wellbores are formed in subterranean formations for various purposes including, for example, extraction of oil and gas from the subterranean formations and extraction of geothermal heat from the subterranean formations. Wellbores can exhibit extremely aggressive environments. For example, wellbores can exhibit abrasive surfaces, can be filled with corrosive chemicals (e.g., caustic drilling muds; well fluids, such as salt water, crude oil, carbon dioxide, and hydrogen sulfide; etc.), and can exhibit increasing high temperatures and pressures at progressively "down-hole" locations. For example, bottom-hole temperatures and pressures at depths of from about 5,000 to about 8,000 meters are often greater than 250° C. and 150 megapascals (MPa), respectively.

The extremely aggressive environments of wellbores can rapidly degrade the materials of assemblies, tools, and structures used in various down-hole applications (e.g., drilling applications, conditioning applications, logging applications, measurement applications, monitoring applications, exploring applications, etc.). Such degradation limits operational efficiency, and results in undesirable repair and replacement costs. Accordingly, there is a continuing need for structures having material configurations capable of withstanding such extremely aggressive environments, as well as for methods of forming such structures.

BRIEF SUMMARY

Embodiments described herein include methods of forming modified thermoplastic structures for down-hole applications, and down-hole tools. For example, in accordance with one embodiment described herein, a method of forming a modified thermoplastic structure for a down-hole application comprises forming a thermoplastic structure comprising at least one thermoplastic material formulated for crosslinking using an electron beam process. The thermoplastic structure is exposed to at least one electron beam to crosslink polymer chains of the thermoplastic structure.

In additional embodiments, a method of forming a modified thermoplastic structure for a down-hole application comprises forming a thermoplastic powder comprising thermoplastic particles each comprising at least one thermoplastic material formulated for crosslinking using an electron beam process. Polymer chains of at least a portion of the thermoplastic particles are crosslinked to form a modified thermoplastic powder. The modified thermoplastic powder is formed into a thermoplastic structure.

In yet additional embodiments, a down-hole tool comprises at least one modified thermoplastic structure comprising an electron beam irradiated material comprising at least one of polyetherketone, polyetheretherketone, polyetherketoneketone, polyetherketoneetherketoneketone, polyphenylene sulfide, polyphenylsulfone, self-reinforced polyphenylene, a polyimide, and a polyamideimide.

BRIEF DESCRIPTION OF THE SEVERAL VIEWS OF THE DRAWINGS

FIGS. 3A and 3B are simplified perspective views illustrating different process stages and structures for the method illustrated in FIG. 2, in accordance with embodiments of the disclosure;

DETAILED DESCRIPTION

Figure 1:
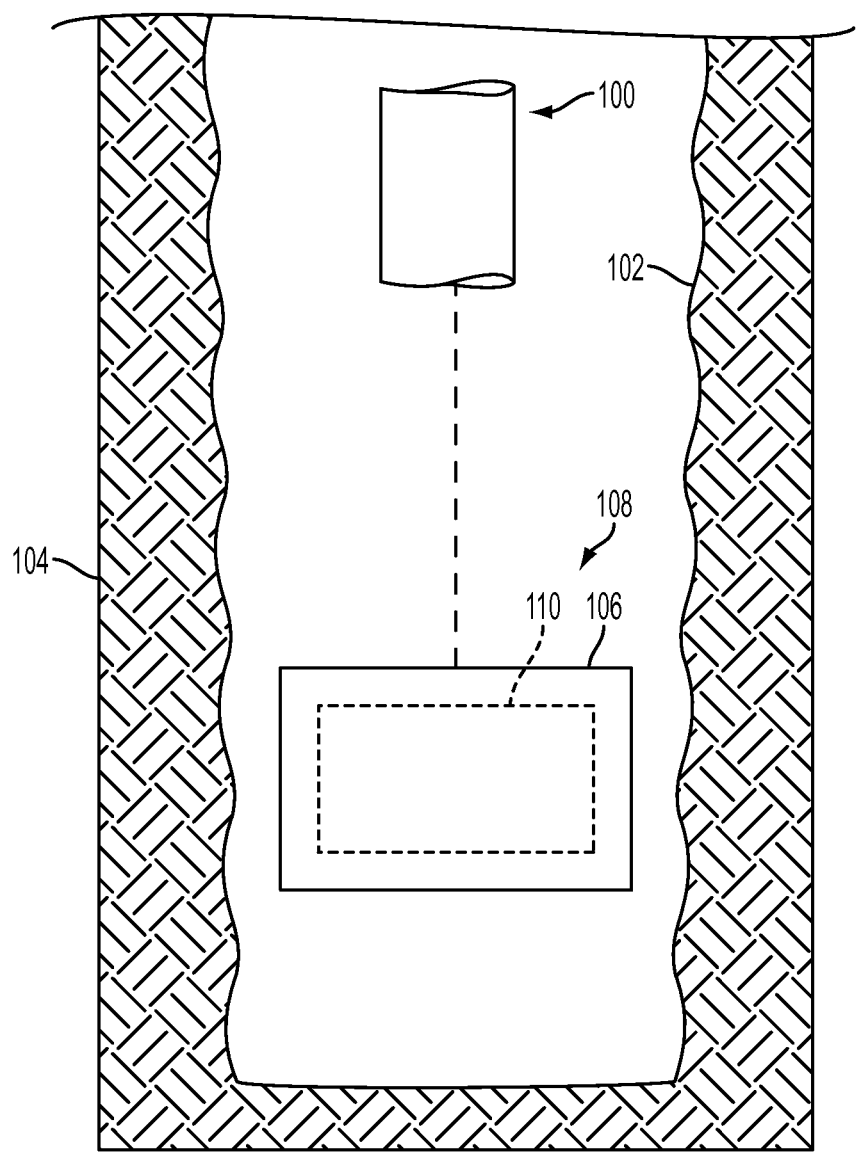
FIG. 1 is a longitudinal schematic view of an assembly for use in down-hole applications, in accordance with an embodiment of the disclosure.

Methods of forming modified thermoplastic structures for use in down-hole applications are described, as are thermoplastic structures for down-hole tools. In some embodiments a method of forming a modified thermoplastic structure for a down-hole application comprises forming a thermoplastic structure including at least one thermoplastic material formulated for crosslinking using an electron beam process. The thermoplastic structure is exposed to at least one electron beam to crosslink at least some polymer chains of the thermoplastic structure. In additional embodiments, a method of forming a modified thermoplastic structure for a down-hole application comprises forming a thermoplastic powder including thermoplastic particles each comprising at least one thermoplastic material formulated for crosslinking using an electron beam process. Polymer chains of at least a portion of the thermoplastic particles are crosslinked to form a modified thermoplastic powder including modified thermoplastic particles. The modified thermoplastic powder, and optionally, one or more additives, is formed into a thermoplastic structure. The modified thermoplastic structures of the disclosure may exhibit enhanced properties (e.g., enhanced mechanical strength, wear resistance, thermal resistance, chemical resistance, etc.) favorable to the use of the modified thermoplastic structure in a down-hole application. The methods and structures of the disclosure may increase the efficiency of down-hole applications and reduce costs as compared to corresponding conventional methods and structures.

The following description provides specific details, such as material types, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow for manufacturing a structure, tool, or assembly. The structures described below do not form a complete tool or a complete assembly. Only those process acts and structures necessary to understand the embodiments of the disclosure are described in detail below. Additional acts to form the complete tool or the complete assembly from various structures may be performed by conventional fabrication techniques. Also note, any drawings accompanying the present application are for illustrative purposes only, and are thus not drawn to scale. Additionally, elements common between figures may retain the same numerical designation.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, the term "substantially," in reference to a given parameter, property, or condition, means to a degree that one of ordinary skill in the art would understand that the given parameter, property, or condition is met with a small degree of variance, such as within acceptable manufacturing tolerances.

FIG. 1 is a longitudinal schematic view of an assembly 100 for use in a down-hole application (e.g., a drilling application, a conditioning application, a logging application, a measurement application, a monitoring application, etc.). As shown in FIG. 1, the assembly 100 may be provided into a wellbore 102 within a subterranean formation 104. The assembly 100 may include at least one modified thermoplastic structure 106 formed in accordance with methods described hereinbelow. The modified thermoplastic structure 106 may be a component of a down-hole tool 108 of the assembly 100. The down-hole tool 108 may, for example, include the modified thermoplastic structure 106 and at least one other component 110 (e.g., a device, such as a sensor; a ring, such as an O-ring; a seal, such as a lip seal; wiring; cable; etc.). The modified thermoplastic structure 106 may at least partially surround (e.g., contain, hold, shield, etc.) the other component 110. In additional embodiments, the modified thermoplastic structure 106 may comprise a stand-alone structure of the assembly 100 (e.g., a valve, such as a ball valve).

Figure 2:
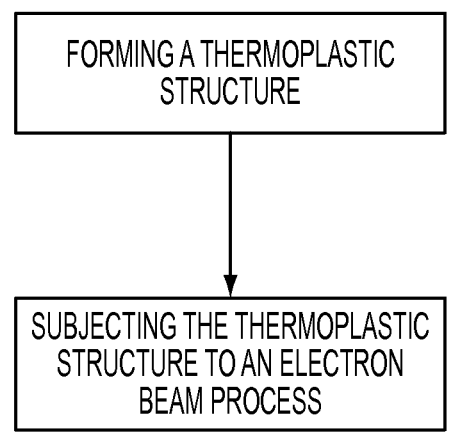
FIG. 2 is a simplified flow diagram illustrating a method of forming a modified thermoplastic structure for use in down-hole applications, in accordance with embodiments of the disclosure.

FIG. 2 is a simplified flow diagram illustrating a method of forming a modified thermoplastic structure (e.g., such as the modified thermoplastic structure 106 previously described with reference to FIG. 1) for a down-hole application, in accordance with embodiments of the disclosure. The method includes forming a thermoplastic structure, and subjecting the thermoplastic structure to an electron beam process. The method illustrated in FIG. 2 is described in further detail below in relation to FIGS. 3A and 3B, which are simplified perspective views of the different process stages and structures for the method depicted in FIG. 2. With the description as provided below, it will be readily apparent to one of ordinary skill in the art that the method described herein may be used in various applications. In other words, the method may be used whenever it is desired to form a modified thermoplastic structure.

Referring to FIG. 3A, a thermoplastic structure 302 may be formed from at least one thermoplastic material, and, optionally, at least one additive. As used herein, the term "thermoplastic material" means and includes a polymeric material that may be softened (e.g., melted) by heat and hardened by cooling in a reversible physical process. The thermoplastic material may be formulated to undergo cross-linking when subjected to an electron beam process, as described in further detail below. The thermoplastic material may, for example, be at least partially converted into a thermoset material upon being subjected to the electron beam process. As used herein, the term "thermoset material" means and includes a solid polymeric material that, due to crosslinking, will not melt upon heating. Suitable thermoplastic materials include, but are not limited to, polyaryletherketones (PAEK), such as polyetherketone (PEK), polyetheretherketone (PEEK), polyetherketoneketone (PEKK), and polyetherketoneetherketoneketone (PEKEKK); polyphenylene sulfide (PPS); polyphenylsulfone (PPSU); self-reinforced polyphenylene (SRP); polyimides (PI); and polyamideimides (PAI). In some embodiments, the thermoplastic material of the thermoplastic structure 302 comprises PEEK. If included, the additive may be at least one of a filler material, an extender material, a cross-linking agent, a lubricant, a pigment, a plasticizer, an anti-oxidant, and another polymeric material. Non-limiting examples of suitable additives are described in further detail below with reference to FIG. 5C. The thermoplastic structure 302 may be substantially homogeneous (e.g., the thermoplastic material may consist of the thermoplastic material, or the thermoplastic material and the additive may be uniformly distributed throughout the thermoplastic structure 302), or may be heterogeneous (e.g., the thermoplastic material and the additive may be non-uniformly distributed throughout the thermoplastic structure 302).

The thermoplastic structure 302 may comprise a bulk structure, may comprise a film (e.g., layer, coating, etc.) at least partially covering another structure, or may comprise a combination thereof. In addition, the thermoplastic structure 302 may exhibit a desired shape and a desired size. For example, as depicted in FIG. 3A, the thermoplastic structure 302 may exhibit a tubular shape. In additional embodiments, the thermoplastic structure 302 may exhibit a different shape, such as a conical shape, a pyramidal shape, a cubic shape, a cuboidal shape, a spherical shape, a hemispherical shape, a cylindrical shape, a semicylindrical shape, truncated versions thereof, or an irregular shape. Irregular shapes include complex shapes, such as shapes associated with down-hole structures and devices (e.g., tools). In some embodiments, the thermoplastic structure 302 may exhibit substantially uniform properties (e.g., thermal resistance, hardness, elastic modulus, bulk modulus, toughness, chemical resistance, abrasion resistance, friction coefficient, mechanical strength, etc.) throughout a thickness $T_1$ thereof.

The thermoplastic structure 302 may be formed using at least one conventional process, such as at least one of a conventional molding process (e.g., an injection molding process, a compression molding process, a transfer molding process, etc.), and a conventional deposition process (e.g., a flame spray process). Such processes are well known in the art, and are therefore not described in detail herein.

Referring next to FIG. 3B, the thermoplastic structure 302 (FIG. 3A) may be subjected to an electron beam process to crosslink polymer chains thereof and form a modified thermoplastic structure 306. As used herein, the terms "crosslink" and "crosslinking" refer to a process in which more than one polymer chain, or more than one portion of a long polymer chain, are joined together by at least one chemical bond (e.g., a covalent bond, a hydrogen bond, etc.). As shown in FIG. 3B, at least a portion of the thermoplastic structure 302 may be exposed to at least one electron beam 308. The electron beam 308 may crosslink non-crosslinked polymer chains of the thermoplastic structure 302, and/or may further crosslink previously crosslinked polymer chains of the thermoplastic structure 302 (e.g., crosslinked polymer chains formed during the formation of the thermoplastic structure 302). The electron beam process may at least partially convert the thermoplastic material of the thermoplastic structure 302 into a thermoset material. The electron beam process may be performed without previously performing another process (e.g., a post-formation thermal anneal process, etc.) to crosslink polymer chains of the thermoplastic structure 302, or may be performed after at least partially crosslinking polymer chains of the thermoplastic structure 302 using another process. The crosslinking facilitated by the electron beam process may enhance one or more properties (e.g., thermal resistance, hardness, tensile strength, tear strength, abrasion resistance, chemical resistance, extrusion resistance, elongation, elastic modulus, bulk modulus, etc.) of the modified thermoplastic structure 306 relative to the thermoplastic structure 302.

The electron beam process may crosslink polymer chains of the thermoplastic structure 302 (FIG. 3A) up to the thickness $T_1$ thereof. In some embodiments, the electron beam process crosslinks polymer chains of the thermoplastic structure 302 to the thickness $T_1$ thereof. In additional embodiments, the electron beam process crosslinks polymer chains of the thermoplastic structure 302 to a depth less than the thickness $T_1$ thereof. For example, referring to FIG. 3A, the electron beam process may crosslink polymer chains of the thermoplastic structure 302 proximate a surface 304 thereof, but may not crosslink polymer chains of the thermoplastic structure 302 distal from the surface 304. Furthermore, referring again to FIG. 3B, the degree of crosslinking (e.g., crosslinking density) may be substantially uniform (e.g., may not vary), or may be non-uniform (e.g., may vary) throughout the thickness $T_1$ of the modified thermoplastic structure 306. For example, the degree of crosslinking may not increase or decrease, may decrease, may increase, may decrease and then increase, or may increase and then decrease in a direction extending away from a surface 310 of the modified thermoplastic structure 306. If the degree of crosslinking is non-uniform, the degree of crosslinking may vary linearly, may vary stepwise, or may vary in a Gaussian manner throughout the thickness of the thermoplastic structure. In addition, different regions of the surface 310 of the modified thermoplastic structure 306 may exhibit substantially the same degree of crosslinking, or at least one region of the surface 310 of the modified thermoplastic structure 306 may exhibit a greater degree of crosslinking than at least one other region of the surface 310 of the modified thermoplastic structure 306. Varying at least one of the depth, degree, and location of crosslinking throughout the modified thermoplastic structure 306 may enable the modified thermoplastic structure 306 to exhibit different properties (e.g., thermal resistance, hardness, tensile strength, tear strength, abrasion resistance, chemical resistance, extrusion resistance, elongation, elastic modulus, bulk modulus, etc.) in desired regions without changing the chemical composition of the modified thermoplastic structure 306.

The depth and degree of crosslinking throughout the thickness $T_1$ of the modified thermoplastic structure 306 may be controlled as a function of the acceleration voltage of the electron beam 308 and a dosage of the electron beam 308. For example, an increase in the acceleration voltage of the electron beam 308 may increase the depth of crosslinking, and an increase in the dosage of the electron beam may increase the degree of crosslinking throughout the depth. As a non-limiting example, the acceleration voltage may be within a range of from about 50 kilovolts (kV) to about 9.0 megavolts (MV) or greater, such as from about 100 KV to about 8.0 MV, from about 100 KV to about 4.0 MV, or from about 100 KV to about 2.0 MV. A single acceleration voltage may be utilized, or multiple acceleration voltage may be utilized (e.g., such as when multiple electron beams are utilized in the electron beam process). In addition, the dosage may be greater than or equal to about 1 megagray (MGy), such as greater than or equal to about 10 MGy, greater than or equal to about 20 MGy, greater than or equal to about 30 MGy, greater than or equal to about 50 MGy, greater than or equal to about 100 MGy, or greater than or equal to about 120 MGy. In some embodiments, the dosage is greater than or equal to about 30 MGy. A single dosage may be utilized, or multiple dosages may be utilized. In addition, the surface 304 (FIG. 3A) of the thermoplastic structure 302 (FIG. 3A) may be substantially evenly exposed to the electron beam 308, or at least one region of the surface 304 of the thermoplastic structure 302 may be exposed to a greater dosage of the electron beam 308 than at least one other region of the surface 304 of the thermoplastic structure 302 (e.g., through use of a mask). The thermoplastic structure 302 may be exposed to the electron beam 308 in an inert atmosphere (e.g., an atmosphere substantially free of oxygen, such as under vacuum, within a nitrogen atmosphere, within a noble gas atmosphere, etc.).

Figure 4:
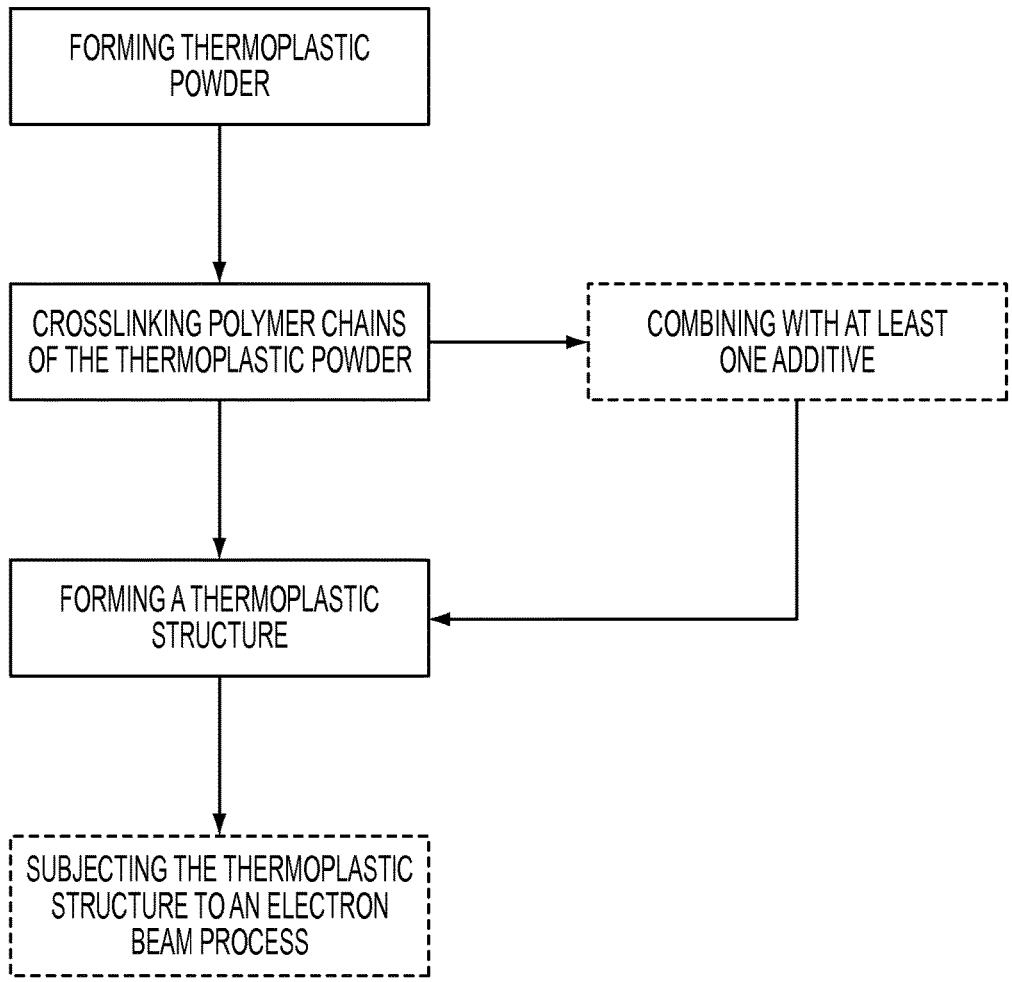
FIG. 4 is a simplified flow diagram illustrating another method of forming a modified thermoplastic structure, in accordance with an embodiment of the disclosure.

FIG. 4 is a simplified flow diagram illustrating another method of forming a modified thermoplastic structure (e.g., such as the modified thermoplastic structure 106 previously described with reference to FIG. 1) for a down-hole application, in accordance with additional embodiments of the disclosure. The method includes forming a thermoplastic powder, crosslinking polymer chains of the thermoplastic powder to form a modified thermoplastic powder, optionally combining the modified thermoplastic powder with at least one additive to form a mixture, forming a thermoplastic structure from the modified thermoplastic powder (or, optionally, the mixture), and optionally subjecting the thermoplastic structure to an electron beam process. The method illustrated in FIG. 4 is described in further detail below in relation to FIGS. 5A through 5D, which depict simplified perspective views of the different process stages and structures of the method depicted in FIG. 4. With the description as provided below, it will be readily apparent to one of ordinary skill in the art that the method described herein may be used in various applications. In other words, the method may be used whenever it is desired to form a modified thermoplastic structure.

Figure 5A:
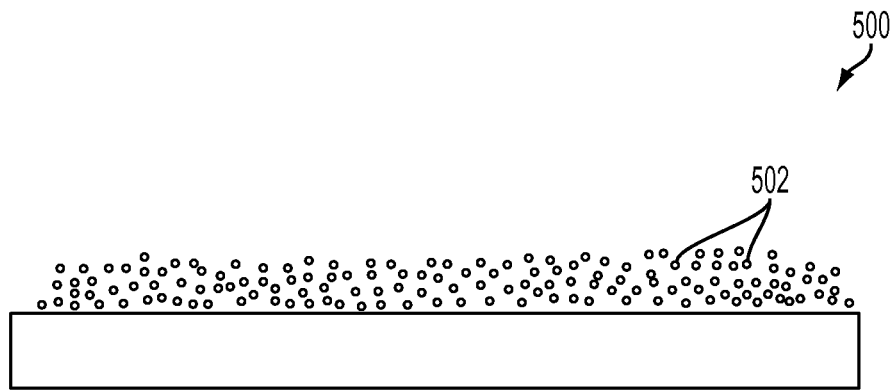
FIGS. 5A through 5D are simplified perspective views illustrating different process stages and structures for the method illustrated in FIG. 4, in accordance with an embodiment of the disclosure.

Referring to FIG. 5A, a thermoplastic powder 500 may be formed to include thermoplastic particles 502. Each of the thermoplastic particles 502 may independently be formed of and include at least one thermoplastic material formulated to undergo crosslinking when subjected to an electron beam process, as described in further detail below. The thermoplastic material may, for example, be at least partially converted into a thermoset material upon when subjected to the electron beam process. Suitable thermoplastic materials include, but are not limited to, a PAEK (e.g., PEK, PEEK, PEKK, PEKEKK, etc.), PPS, PPSU, SRP, PI, and PAI. In some embodiments, the thermoplastic material of each of the thermoplastic particles 502 comprises PEEK.

Each of the thermoplastic particles 502 may independently be of a desired size. The thermoplastic particles 502 may comprise, for example, at least one of micro-sized thermoplastic particles and nano-sized thermoplastic particles. As used herein the term "micro-sized" means and includes a size (e.g., width or diameter) of greater than or equal to about one (1) micrometer (μm), such as from about 1 μm to about 500 μm used herein the term "nano-sized" means and includes a size (e.g., width or diameter) of less than 1 μm. In some embodiments, the nano-sized thermoplastic particles may be less than or equal to about 500 nanometers (nm) in size, or less than or equal to about 250 nm in size. In addition, each of the thermoplastic particles may independently be of a desired shape, such as at least one of a spherical shape, a hexahedral shape, an ellipsoidal shape, a cylindrical shape, a conical shape, or an irregular shape. In some embodiments, each of the thermoplastic particles has a substantially spherical shape. The thermoplastic particles may be monodisperse, wherein each of thermoplastic particles has substantially the same material composition (e.g., PEK, PEEK, PEKK, PEKEKK, PPS, PPSU, SRP, PI, PAI, etc.), particle size, and particle shape, or may be polydisperse, wherein the thermoplastic particles include a range of material compositions, particle sizes, and/or particle shapes. Each of the thermoplastic particles may be discrete, or at least two of the thermoplastic particles may be agglomerated into at least one larger structure (e.g., a thermoplastic pellet formed of and including multiple thermoplastic particles). The thermoplastic powder 500 may be formed using conventional methods and equipment, which are not described in detail herein.

Figure 5B:
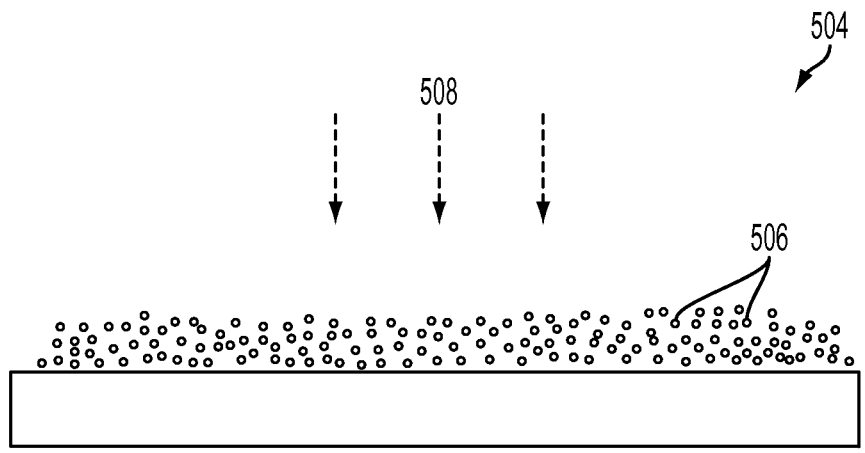

Referring next to FIG. 5B, the thermoplastic powder 500 (FIG. 5A) may be exposed to at least one process to crosslink polymer chains of at least a portion of the thermoplastic particles 502 and form a modified thermoplastic powder 504 including modified thermoplastic particles 506. The process may effectuate intra-particle crosslinking of polymer chains (e.g., crosslinking of polymer chains of one of thermoplastic particles 502) without substantially effectuating inter-particle crosslinking of polymer chains (e.g., crosslinking of polymer chains of one of the thermoplastic particles 502 with polymer chains of another of the thermoplastic particles 502). In additional embodiments, the process may effectuate intra-particle crosslinking of polymer chains and at least some inter-particle crosslinking of polymer chains. Substantially all of the thermoplastic particles 502 may undergo a substantially similar amount of crosslinking, or at least one of the thermoplastic particles 502 may undergo a different amount of intra-particle crosslinking than at least one other of the thermoplastic particles 502. The extent of crosslinking (e.g., throughout the bulk of the modified thermoplastic powder 504, and within each modified thermoplastic particle 506 thereof) may at least partially depend on the process utilized to effectuate the crosslinking, as described in further detail below.

In some embodiments, the thermoplastic powder 500 (FIG. 5A) may be subjected to an electron beam process to crosslink polymer chains of at least a portion of the thermoplastic particles 502 and form a modified thermoplastic powder 504. For example, as depicted in FIG. 5B, at least a portion of the thermoplastic powder 500 (FIG. 5A) may be exposed to at least one electron beam 508 to form the modified thermoplastic powder 504. The number of modified thermoplastic particles 506 throughout the modified thermoplastic powder 504 and degree of crosslinking within each of the modified thermoplastic particles 506 may be controlled by the accelerating voltage, dosage, and location of the electron beam 508. An increase in the acceleration voltage of the electron beam may increase a penetration depth of the electron beam into the bulk of the thermoplastic powder 500 (FIG. 5A), and an increase in the dosage of the electron beam 508 may increase the degree of crosslinking throughout the depth (e.g., in each of the thermoplastic particles 502 exposed). As a non-limiting example, the acceleration voltage may be within a range of from about 50 kilovolts (kV) to about 9.0 megavolts (MV) or greater, such as from about 100 KV to about 8.0 MV, from about 100 KV to about 4.0 MV, or from about 100 KV to about 2.0 MV. A single acceleration voltage may be utilized, or multiple acceleration voltage may be utilized (e.g., such as when multiple electron beams 508 are utilized in the electron beam process). In addition, the dosage may be greater than or equal to about 1 MGy, such as greater than or equal to about 10 MGy, greater than or equal to about 20 MGy, greater than or equal to about 30 MGy, greater than or equal to about 50 MGy, greater than or equal to about 100 MGy, or greater than or equal to about 120 MGy. A single dosage may be utilized, or multiple dosages may be utilized. The thermoplastic powder 500 (FIG. 5A) may be substantially evenly laterally exposed to the electron beam 508, or at least one lateral region of the thermoplastic powder 500 may be exposed to a greater dosage of the electron beam 508 than at least one other lateral region of the thermoplastic powder 500 (e.g., through use of a mask). In some embodiments, the electron beam process is controlled such that each thermoplastic particle 502 of the thermoplastic powder 500 is converted to a modified thermoplastic particle 506, and such that each of the modified thermoplastic particles 506 exhibits substantially the same degree of crosslinking as each other of the modified thermoplastic particles 506. In additional embodiments, the electron beam process may convert at least a portion of the thermoplastic material of at least some of the thermoplastic particles 502 into a thermoset material. The electron beam process may, for example, convert at least some of the thermoplastic particles 502 into thermoset particles. In embodiments wherein at least a majority of the thermoplastic particles 502 are converted into thermoset particles, at least one at least one additive (e.g., crosslinking agent, other polymeric material, etc.) may be utilized to effectuate forming a thermoplastic structure including the thermoset particles. The thermoplastic powder 500 (FIG. 5A) may be exposed to the electron beam 508 in an inert atmosphere (e.g., under vacuum, within a nitrogen atmosphere, within a noble gas atmosphere, etc.).

In additional embodiments, the thermoplastic powder 500 may be exposed to an oxidation process to crosslink polymer chains of at least some of the thermoplastic particles 502 and form the modified thermoplastic powder 504. For example, the thermoplastic powder 500 may be exposed to an oxygen-containing atmosphere (e.g., an air atmosphere) to form the modified thermoplastic particles 506. The number of modified thermoplastic particles 506 and degree of crosslinking within each of the modified thermoplastic particles 506 may be controlled by the amount of oxygen in the oxygen-containing atmosphere and the duration of exposure. In some embodiments, oxidation process is controlled such that each of the thermoplastic particles 502 is converted to a modified thermoplastic particle 506, and such that each of the modified thermoplastic particles 506 exhibits substantially the same degree of crosslinking as each other of the modified thermoplastic particles 506. In additional embodiments, the oxidation process may convert at least a portion of the thermoplastic material of at least some of the thermoplastic particles 502 into a thermoset material. For example, the oxidation process may convert the thermoplastic material proximate surfaces of at least some of the thermoplastic particles 502 into a thermoset material.

In further embodiments, a combination of an electron beam process and an oxidation process may be utilized to crosslink polymer chains of at least some of the thermoplastic particles 502. For example, the thermoplastic powder 500 may be exposed to the electron beam process and then may be exposed to the oxidation process, or the thermoplastic powder 500 may be exposed to the oxidation process and then may be exposed to the electron beam process.

Figure 5C:
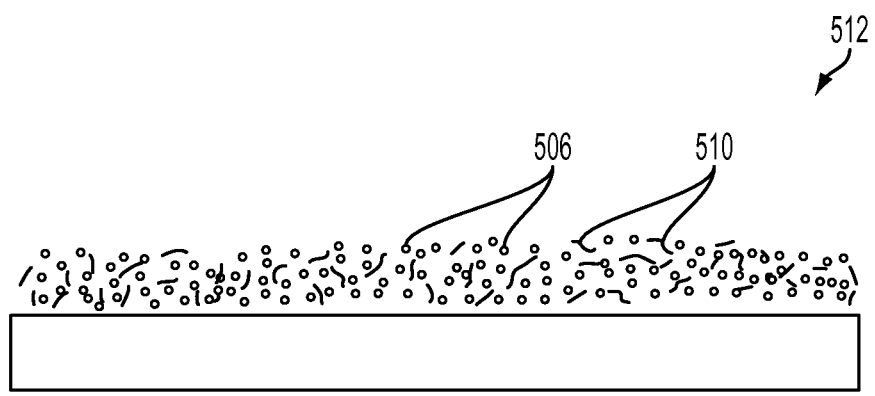

Referring to FIG. 5C, upon formation, the modified thermoplastic powder 504 (FIG. 5B) may, optionally, be combined with at least one additive 510 to form a mixture 512. By way of non-limiting example, the additive 510 may be at least one of a filler material, an extender material, a cross-linking agent, a lubricant, a pigment, a plasticizer, an anti-oxidant, and another polymeric material. The type and amount of the additive 510 may at least partially depend on the properties of modified thermoplastic powder 504, and on desired properties of a thermoplastic structure to be formed, as described in further detail below. The mixture 512 may be substantially homogeneous (e.g., the modified thermoplastic particles 506 and the additive 510 may be uniformly dispersed throughout the mixture 512), or may be heterogeneous (e.g., the modified thermoplastic particles 506 and the additive 510 may be non-uniformly dispersed throughout the mixture 512).

In some embodiments, the at least one additive 510 may comprise at least one filler material. The filler material may be a material formulated and configured to enhance at least one property (e.g., thermal resistance, hardness, tensile strength, tear strength, abrasion resistance, chemical resistance, extrusion resistance, elongation, elastic modulus, bulk modulus, etc.) of a thermoplastic structure to be formed. Suitable fillers materials include, but are not limited to, carbon fillers (e.g., carbon black; graphene; carbon fibers, such as carbon nanofibers, single-walled carbon nanotubes, multi-walled carbon nanotubes; etc.), polytetrafluoroethene (PTFE) fillers, aromatic polyamide fillers, slagwool fillers (magnesium calcium aluminum silicates), cellulose fillers, ZYLON® fillers, clay fillers, glass fillers, and silica fillers. The filler material may be provided as at least one of a plurality of particles and plurality of fibers. Individual units (e.g., particles, fibers) of the filler material may range from micro-sized (e.g., having a cross-sectional width or diameter greater than or equal to about one micrometer) to nano-sized (e.g., having a cross-sectional width or diameter less than about one micrometer, such as less than or equal to about 500 nanometers), and may each independently have a desired shape (e.g., a spherical, hexahedral, ellipsoidal, cylindrical, tubular, conical, or irregular shape). The size and shape of the individual units may facilitate different properties in the thermoplastic structure to be formed. For example, nano-sized units (e.g., nanoparticles, nanofibers, nanotubes, etc.) may facilitate enhanced hardness and tensile strength in the thermoplastic structure to be formed as compared to micro-sized units. The individual units of the filler material may be monodisperse, wherein each of the individual units has substantially the same material composition, size, and shape, or may be polydisperse, wherein the individual units include a range of material compositions, sizes, and/or shapes.

As a non-limiting example, if combined with the modified thermoplastic powder 504, the filler material may be provided at a ratio of within a range from about 0 parts to about 150 parts of the filler material per 100 parts of modified thermoplastic powder 504, such as from about 0.05 parts to about 5 parts of the filler material per 100 parts of the modified thermoplastic powder 504, from about 5 parts to about 25 parts of the filler material per 100 parts of the modified thermoplastic powder 504, from about 25 parts to about 50 parts of the filler material per 100 parts of the modified thermoplastic powder 504, from about 50 parts to about 75 parts of the filler material per 100 parts of the modified thermoplastic powder 504, from about 75 parts to about 100 parts of the filler material per 100 parts of the modified thermoplastic powder 504, or from about 100 parts to about 125 parts of the filler material per 100 parts of modified thermoplastic powder 504.

In additional embodiments, the at least one additive 510 may comprise at least one crosslinking agent. The crosslinking agent may be a material that facilitates or enhances crosslinking of polymer chains of the modified thermoplastic powder 504, and/or another polymeric material in at least one subsequent process, as described in further detail below. The cross-linking agent may, for example, enhance cross-linking of polymer chains during or after the formation of a thermoplastic structure, such as during an electron beam process performed after forming the thermoplastic structure. The cross-linking agent may effectuate crosslinking upon exposure to at least one electron beam, or may not effectuate crosslinking upon exposure to at least one electron beam. The type and amount of crosslinking agent may at least partially depend on the thermoplastic powder 500 (e.g., PEK, PEEK, PEKK, PEKEKK, PPS, PPSU, SRP, PI, PAI, etc.) and other additives (e.g., filler material, other polymeric material, etc.) utilized, and on the desired properties of the thermoplastic structure to be formed. A suitable cross-linking agent may, for example, comprise at least one of an organic peroxide, an inorganic peroxide, sulfur, diallyl maleate, triallyl cyanurate, triallyl isocyanurate, n,n'-m-phenylene bismaleimide, a polyacrylate, a polymethacrylate, a trifunctional acrylate, a trifunctional methacrylate, pentaerythritol tetraacrylate, dipentaerythritol pentaacrylate, trimethylolpropane trimethacrylate, ethylene glycol dimethacrylate, polyethylene glycol dimethacrylate, allyl methacrylate, a liquid butadiene, and methacrylated polybutadiene.

As a non-limiting example, if combined with the modified thermoplastic powder 504, the crosslinking agent may be provided at a ratio within a range of from about 0 parts to about 50 parts of the crosslinking agent per 100 parts of the modified thermoplastic powder 504, such as from about 0.05 parts to about 5 parts of the crosslinking agent per 100 parts of the modified thermoplastic powder 504, from about 5 parts to about 10 parts of the crosslinking agent per 100 parts of the modified thermoplastic powder 504, from about 10 parts to about 25 parts of the crosslinking agent per 100 parts of the modified thermoplastic powder 504, or from about 25 parts to about 50 parts of the crosslinking agent per 100 parts of the modified thermoplastic powder 504.

In further embodiments, the at least one additive 510 may comprise at least one other polymeric material. The other polymeric material may be formulated and configured, to enhance at least one property (e.g., thermal resistance, hardness, tensile strength, tear strength, abrasion resistance, chemical resistance, extrusion resistance, elongation, elastic modulus, bulk modulus, etc.) of a thermoplastic structure to be formed. The other polymeric material may, for example, be at least one of another thermoplastic material, a thermoset material, and an elastomeric material. In some embodiments, the other polymeric material may be provided as a powder of polymeric particles. The polymeric particles may range from micro-sized (e.g., having a cross-sectional width or diameter greater than or equal to about one micrometer) to nano-sized (e.g., having a cross-sectional width or diameter less than about one micrometer, such as less than or equal to about 500 nanometers), and may each independently have a desired shape (e.g., a spherical, hexahedral, ellipsoidal, cylindrical, conical, or irregular shape). Polymer chains of each of the polymeric particles may be substantially non-crosslinked, or polymer chains of at least one of the polymer particles may be crosslinked (e.g., at least one of the polymer particles may exhibit intra-particle crosslinking). The polymeric particles may be monodisperse, wherein each of the polymeric particles has substantially the same material composition, size, and shape, or may be polydisperse, wherein the polymeric particles include a range of material compositions, sizes, and/or shapes. Each of the polymeric particles may be discrete, or at least two of the polymeric particles may be agglomerated into at least one larger polymeric structure (e.g., a polymeric pellet including multiple smaller polymeric particles).

As a non-limiting example, if combined with the modified thermoplastic powder 504, the other polymeric material may be provided at a ratio within a range of from about 0 parts to about 150 parts of the other polymeric material per 100 parts of the modified thermoplastic powder 504, such as from about 0.05 parts to about 25 parts of other the polymeric material per 100 parts of the modified thermoplastic powder 504, from about 25 parts to about 50 parts of the other polymeric material per 100 parts of the modified thermoplastic powder 504, from about 50 parts to about 75 parts of the other polymeric material per 100 parts of the modified thermoplastic powder 504, from about 75 parts to about 100 parts of the other polymeric material per 100 parts of the modified thermoplastic powder 504, or from about 100 parts to about 125 parts of the other polymeric material per 100 parts of the modified thermoplastic powder 504.

Figure 5D:
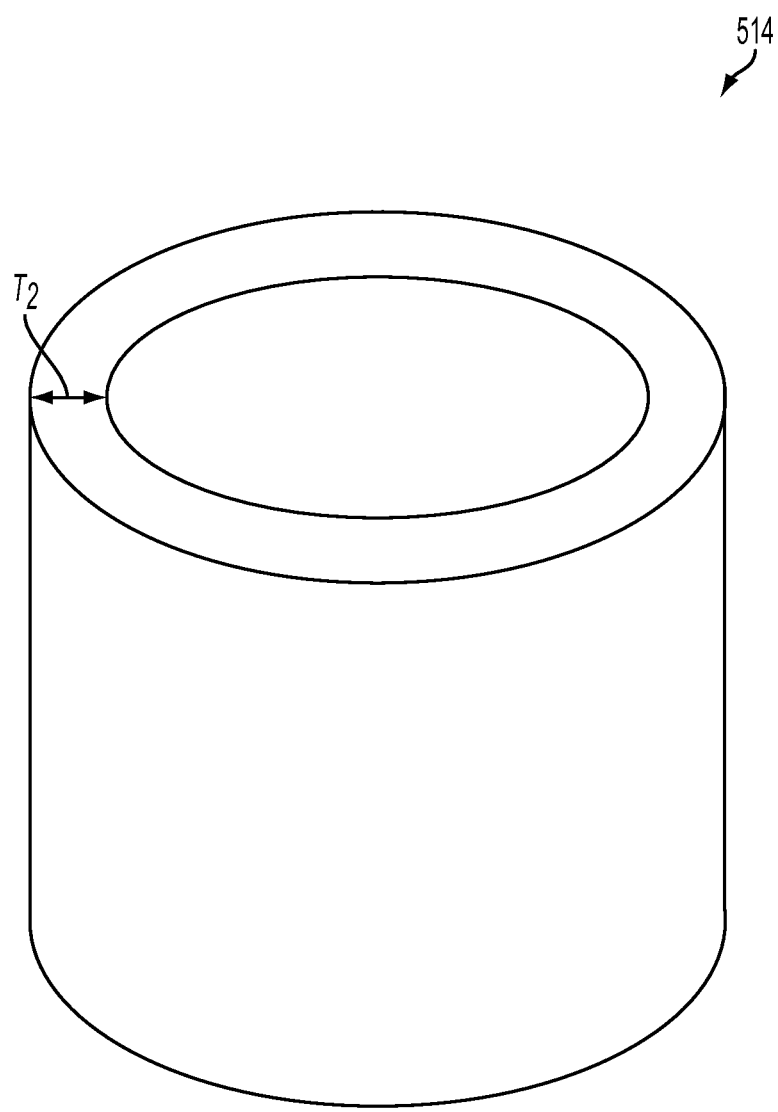

Referring to FIG. 5D, the modified thermoplastic powder 504 (FIG. 5B), or the mixture 512 (FIG. 5C), may be formed into a thermoplastic structure 514 for use in down-hole applications. The thermoplastic structure 514 may comprise a bulk structure, or may comprise a film (e.g., layer, coating) at least partially coating another structure. For example, a volume of the modified thermoplastic powder 504 (or the mixture 512) may be subjected to a conventional molding process (e.g., an injection molding process, a compression molding process, a transfer molding process, etc.) to form the thermoplastic structure 506 to comprise a bulk structure of a desired shape and size. As another example, the modified thermoplastic powder 504 (or the mixture 512) may be subjected to a conventional deposition process (e.g., a flame spray process) to form the thermoplastic structure 514 to comprise a film of desired dimensions (e.g., length, width, thickness) on or over another structure. While FIG. 5D depicts the thermoplastic structure 514 as a tubular structure, the thermoplastic structure 514 may exhibit a different structural configuration (e.g., shape and size). The thermoplastic structure 514 may, for example, exhibit a conical shape, a pyramidal shape, a cubic shape, a cuboidal shape, a spherical shape, a hemispherical shape, a cylindrical shape, a semicylindrical shape, truncated versions thereof, or an irregular shape. Irregular three-dimensional shapes include complex shapes, such as shapes associated with down-hole structures and devices (e.g., tools). The modified thermoplastic powder 504 (and/or the other polymeric material, if present) may undergo at least some crosslinking during the formation of the thermoplastic structure 514 (e.g., crosslinking facilitated through a crosslinking agent combined with the modified thermoplastic powder 504 or the other polymeric material). The thermoplastic structure 514 may exhibit substantially uniform properties (e.g., thermal resistance, hardness, elastic modulus, bulk modulus, toughness, chemical resistance, abrasion resistance, friction coefficient, mechanical strength, and other characteristics) throughout a thickness $T_2$ thereof.

Following formation, the thermoplastic structure 514, may, optionally, be subjected to an electron beam process. The electron beam process may be substantially similar to that previously described in relation to FIG. 3B. The electron beam process may enhance properties (e.g., thermal resistance, hardness, elastic modulus, bulk modulus, toughness, chemical resistance, abrasion resistance, friction coefficient, mechanical strength, and other characteristics) of at least a portion of the thermoplastic structure 514. In additional embodiments, such as in embodiments where the thermoplastic structure 514 already exhibits desired properties as a result of previous processing (e.g., processing prior to or during the formation of the thermoplastic structure 302, such as from subjecting the thermoplastic powder 500 to the electron beam process previously described with reference to FIG. 5B), the electron beam process may be omitted.

The methods of the disclosure facilitate the formation of modified thermoplastic structures exhibiting enhanced properties (e.g., enhanced mechanical strength, wear resistance, thermal resistance, chemical resistance, etc.) enabling the modified thermoplastic structures to withstand the aggressive environmental conditions (e.g., abrasive materials, corrosive chemicals, high temperatures, high pressures, etc.) frequently experienced in down-hole applications (e.g., drilling applications, conditioning applications, logging applications, measurement applications, monitoring applications, etc.) better than many structures conventionally utilized. Accordingly, the modified thermoplastic structures formed by the methods of the disclosure may exhibit a relatively prolonged operational life, which may reduce costs and increase the efficiency of down-hole applications.

While the disclosure is susceptible to various modifications and alternative forms, specific embodiments have been shown by way of example in the drawings and have been described in detail herein. However, the disclosure is not intended to be limited to the particular forms disclosed. Rather, the disclosure is to cover all modifications, equivalents, and alternatives falling within the scope of the disclosure as defined by the following appended claims and their legal equivalents.

What is claimed is:

1. A method of forming a modified thermoplastic structure, comprising:
   forming a material consisting of a thermoplastic powder consisting of thermoplastic particles selected from the group consisting of polyetherketone particles, polyetheretherketone particles, polyetherketoneketone particles, polyetherketoneetherketoneketone particles, polyphenylene sulfide particles, polyphenylsulfone particles, self-reinforced polyphenylene particles, and polyamideimide particles;
   treating the material with at least one electron beam to crosslink at least a portion of polymer chains of at least a portion of the thermoplastic particles of the thermoplastic powder to form a modified material consisting of a modified thermoplastic powder;

combining the modified material with at least one crosslinking agent to form a further modified material, the at least one crosslinking agent formulated for crosslinking polymer chains of the modified thermoplastic powder upon exposure to at least one additional electron beam; and forming the further modified material into a thermoplastic structure.

2. The method of claim 1, wherein treating the material with at least one electron beam to crosslink at least a portion of the polymer chains of at least a portion of the thermoplastic particles comprises effectuating intra-particle crosslinking of the thermoplastic particles without substantially effectuating interparticle crosslinking of the thermoplastic particles.

3. The method of claim 1, wherein treating the material with at least one electron beam comprises exposing the material to the at least one electron beam in an inert atmosphere.

4. The method of claim 1, further comprising exposing the material to an oxygen containing atmosphere prior to treating the material with the at least one electron beam.

5. The method of claim 1, wherein combining the modified material with at least one crosslinking agent comprises combining the modified material with the crosslinking agent at a ratio within a range of from about 0.05 parts to about 50 parts of the crosslinking agent per 100 parts of the modified material.

6. The method of claim 1, further comprising subjecting the thermoplastic structure to an electron beam process to crosslink polymer chains of at least a portion of the thermoplastic structure.

7. The method of claim 1, wherein treating the material with at least one electron beam to crosslink at least a portion of the polymer chains of at least a portion of the thermoplastic particles of the thermoplastic powder to form a modified material comprises converting at least a portion of thermoplastic material of one or more of the thermoplastic particles into a thermoset material.

8. The method of claim 7, wherein converting at least a portion of the thermoplastic material of one or more of the thermoplastic particles into a thermoset material comprises completely converting at least some of the thermoplastic particles into thermoset particles.

* * * * *

UNITED STATES PATENT AND TRADEMARK OFFICE
CERTIFICATE OF CORRECTION

PATENT NO. : 10,351,686 B2
APPLICATION NO. : 13/798886
DATED : July 16, 2019
INVENTOR(S) : Michal Benes and Jiaxiang Ren Page 1 of 1

It is certified that error appears in the above-identified patent and that said Letters Patent is hereby corrected as shown below:

In the Specification
Column 7, Line 11, change "500 µm used" to --500 µm. As used--
Column 11, Line 51, change "structure 506 to" to --structure 514 to--

Signed and Sealed this
Tenth Day of September, 2019

Andrei Iancu
*Director of the United States Patent and Trademark Office*